Feb. 23, 1937.  J. McKAY  2,071,758

METHOD OF WATERPROOFING STRUCTURES

Filed April 19, 1935  2 Sheets-Sheet 1

INVENTOR
JOHN McKAY.
BY
ATTORNEY

Feb. 23, 1937.  J. McKAY  2,071,758
METHOD OF WATERPROOFING STRUCTURES
Filed April 19, 1935   2 Sheets-Sheet 2

INVENTOR
JOHN McKAY.
BY
ATTORNEY

Patented Feb. 23, 1937

2,071,758

UNITED STATES PATENT OFFICE 2,071,758

METHOD OF WATERPROOFING STRUCTURES

John McKay, Glenside, Pa.

Application April 19, 1935, Serial No. 17,243

14 Claims. (Cl. 72—106)

My invention relates to the problem of placing a plastic solid in a suitable region and it has for its object to agglomerate the solid from an emulsion in the region.

More particularly, my process comprises injecting a soap-type emulsion of plastic medium, such as asphalt or bituminous material, and a de-emulsifying agent into a desired place where the emulsion is acted upon by the agent to secure agglomeration or coalescence of the plastic medium. The emulsion may be caused to penetrate very small cracks, porous structures, between contacting surfaces, and the like, to secure agglomeration in situ. The emulsion and a suitable agent provide for agglomeration of the plastic medium into a semi-solid plastic mass, which may serve as a flexible filler, which will adhere to membranes and surfaces, which is inert, and which will not react on materials, such as iron or cement, but, on the contrary, will protect the latter.

My method of securing agglomeration of medium from an emulsion may be used in any situation where a filler or cover is desired. For example, it may be used to repair a cracked or porous wall to render the latter impervious to water or water-proof, to fill voids between concrete and structural steel, to protect structural steel, to form water-proof layers in structures of various kinds, and to fill voids and interstices in any suitable formation.

The soap-type emulsion may be broken in place by any suitable electrolyte, such as sodium or potassium silicate; chlorides, such as sodium, magnesium, calcium, or potassium; soluble sulphates, such as sodium, magnesium, and aluminum, and, or for that matter, any salt soluble in water and which, due either to chemical or physical action, will throw soap out of solution. The choice of agent for this purpose is largely governed by circumstances. If the character of the region where it is desired to secure agglomeration is such that leakage is not too great, I prefer to use a de-emulsifying agent, for example, sufficiently concentrated commercial silicate or water glass, which will not act so rapidly as to interfere with flow and good penetration, filling, covering, bonding and adhesion. On the other hand, if the region wherein agglomeration is to be effected is of such a character that leakage of emulsion would occur if a relatively slowly acting de-emulsifying agent is used, then a more rapidly acting agent, such as calcium chloride or aluminum sulphate, is employed, at least for the purpose of effecting a seal. In some cases, it may be desirable to incorporate a suitable inert and insoluble filler in the de-emulsification agent for the plastic medium.

The invention may be applied in a variety of ways. It may be used to waterproof, seal, or fill structures of various kinds, such as walls, voids in concrete adjacent to structural steel, cracks in walls, or spaces in masonry walls, such as the spaces between vertical layers of a brick wall. Furthermore, the region to be treated may be an earth formation. In fact the invention is useful wherever it is desired to effect agglomeration of plastic medium from a suitable emulsion.

Assuming a crack in a wall having an earth backing is to be filled or covered so as to be rendered water-proof, then openings are drilled from the accessible side and emulsion and de-emulsifying agent are injected or pumped through the openings in such manner as to form an agglomerate permeating the said region adjacent to the crack and covering and filling the latter. With injection openings formed at each side of a crack, emulsion may be pumped in at one side and the de-emulsifying agent at the other or both media may be injected or pumped at both sides. Emulsion is preferably injected first to assure of agglomeration in intimate contact with the desired surface or in a desired place. Should a filling or backing structure be desired to fill open spaces or to prevent channelling by subsequent injections, after preliminary injection of emulsion, cement grout or neat cement may be pumped in after which suitable injections of emulsion and de-emulsifying agent may be made. If desired a filler, such as clay, silica flour or any inert or insoluble substance, may be used with the de-emulsifying agent.

To facilitate an understanding of my invention, reference is made to the accompanying drawings, forming a part of this application and in which.

Figure 1:
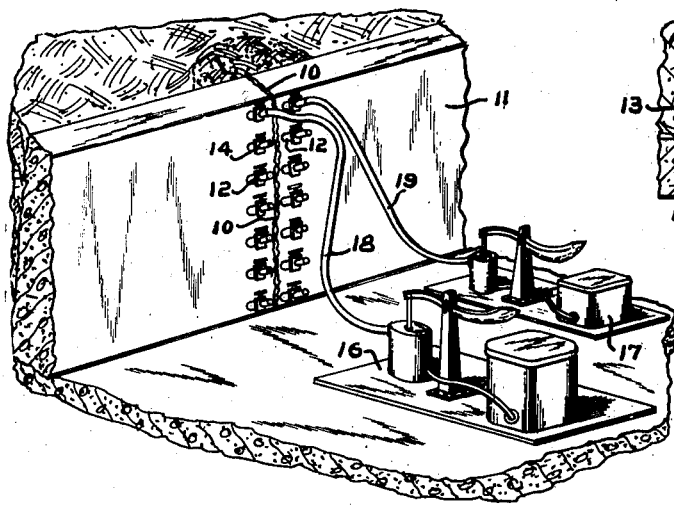
Figs. 1 and 2 are diagrammatic views of a structure showing my method of repair applied thereto.
Figure 2:
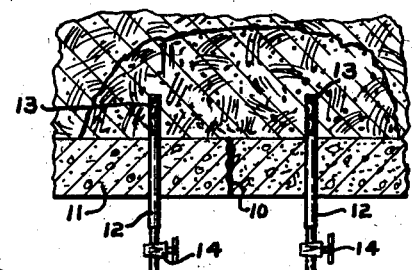

Referring now to the drawings to give a clearer understanding of my process, in Figs. 1 and 2, a crack or opening 10 has developed in the wall 11 and it is desired to provide a plastic mass penetrating the adjacent dirt and covering the opening so as to restore or provide water-proofness and which will be sufficiently plastic to permit of expansion and contraction of the structure without reopening of the crack or opening. Accordingly, I provide an emulsion of a plastic medium, which, when agglomerated, forms a filler closely bonding to the structure and having sufficient plasticity to take care of expansion and contraction effects; and I use, in connection with such emulsion, a suitable de-emulsifying agent.

In Figs. 1 and 2, injection nipples or short pipes 12 are shown in the openings drilled in the wall, the pipes or nipples preferably extending sufficiently back of the wall so that media issuing from the lateral perforations 13 therein may penetrate the region adjacent to the crack. The nipples are provided with suitable closing means, for example, plug valves 14.

Injection pumps 16 and 17 are used to inject media through the nipples 12, the pumps having hose connections 18 and 19 for attachment to the nipples. The plug valves provide for closure of such nipples as are not, for the time being, connected to the pumps; and, in any event, it is preferred to have plug valves associated with the nipples connected to the pumps so that a single pump may be operated with all nipples, except the one to which it is connected, closed, whereby escape, through other nipples, of media being pumped is prevented.

Emulsion is first injected through all of the nipples or pipes followed by injection of de-emulsifying agent to assure of a base of agglomerate adhering directly to desired surfaces, after which emulsion may be injected at one side and de-emulsifying agent at the other or emulsion and de-emulsifying agent may be pumped through alternate pipes at each side. If the condition of the region adjacent to the crack is such that leakage will not readily occur, then because of better penetration and travel of media, I prefer to use a relatively slow acting de-emulsifying agent, such as sodium silicate. On the other hand, if water flow back of the wall is excessive, should the open nature or perviousness of the soil be too great, or if leakage through the opening or crack should be too rapid for satisfactory agglomeration by means of silicate, then a quicker acting agent, such as calcium chloride, is injected, preferably followed by injection of silicate and emulsion. Then again, depending upon circumstances, after preliminary injection of emulsion, it may be desirable to inject cement grout followed by silicate or the silicate may include a suitable filler. In all cases, the essential feature is agglomeration or deposition of plastic medium from the emulsion to form a semi-plastic body in the desired location.

After water-proofing in the above manner, the injection openings are preferably sealed, although in some cases the agglomerate may be effective for this purpose.

Figure 3:
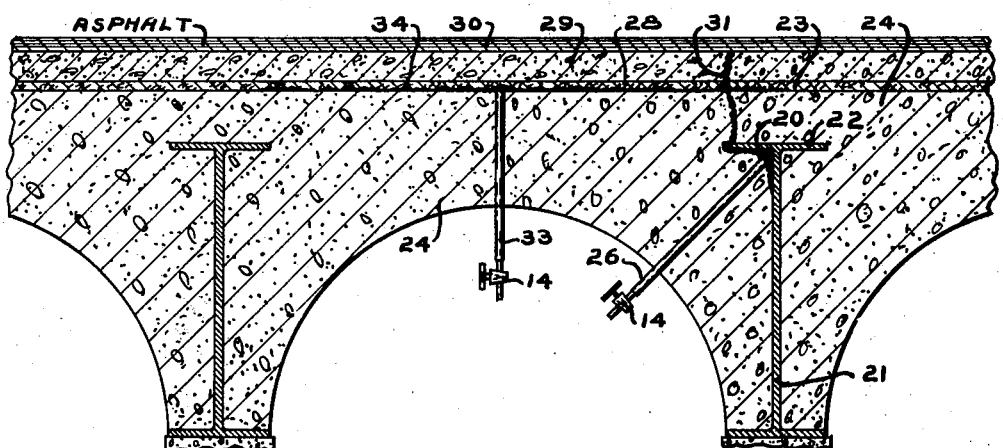
Figs. 3 and 4 show other features of structures in connection with which the invention may be usefully employed.

In Fig. 3, I show two further applications of the invention, first, to fill the fillet space 20 in the upper corner of an I-beam and included between the web 21 and top flange 22 and, second, to provide an asphalt layer between the fabric covering 23 and the top surface of the concrete base 24.

In building a concrete and steel structure, it is very difficult to fill a top corner space, such as the space 20 in Fig. 3, in consequence of which a void is left which may serve as a passage or space for water leaking thereinto, with the result that, not only may the steel be corroded, but such passage or space may contribute to the lack of water-proofness of the structure as a whole. Such space may be filled by the use of my invention. For example, if the concrete is drilled so that a nipple 26 reaches the corner space 20, then the media may be injected to fill the space. If there should be any tendency to undue leakage, then a quick-acting de-emulsifying agent, such as calcium chloride or aluminum sulphate, may be used with an emulsion of asphalt to produce a seal or plug, whereupon subsequent injections of asphalt emulsion and de-emulsifying agent, such as silicate, may be made to secure the desired agglomeration. After depositing a plastic envelope adhering to the bounding surfaces of the fillet space, cement grout may be injected so as to fill the plastic envelope.

Also, Fig. 3 shows the invention used to water-proof the structure 24, particularly when the latter provides the base structure of a roof or roadway. The top surface of the structure 24, ordinarily has water-proof fabric or multiple-ply material 28 placed thereon, such material usually being impregnated with asphalt or bituminous material and laid in like material; and then, if a roadway is to be placed thereon, a layer 29 of concrete protection may be placed on the fabric 28, followed by a top or surface layer, 30 of asphalt. If a crack 31 should develop in the composite structure, water-proofness may be impaired; and location of the crack may be impossible, as shown. In any case, the entrance adjacent to the fabric is hidden. Hence, the invention is so applied as to form a layer of agglomerate between the fabric and the concrete base structure, filling breaks in the fabric as well as any cracks in the concrete structure.

Assuming that the construction shown in Fig. 3 is to be water-proofed because of a crack, such as the crack 31, then a hole may be drilled through the structure 24 and a nipple 33 inserted for the injection of emulsion and agglomerant. The plastic agglomerate will form over a considerable area, as at 34 in Fig. 3, radiating from the drilling to provide a water-proof layer between the fabric and concrete and filling cracks or breaks to prevent leakage of water through cracks, fissures or voids in the concrete. A sufficient number of drillings and injections may be made to provide a continuous layer of agglomerate over a desired area. If the character of the structure is such that leakage of emulsion and relatively slow acting de-emulsifying agent would occur, then sealing may be effected, as hereinbefore indicated, by the use of a quick-acting de-emulsifying agent.

Figure 4:
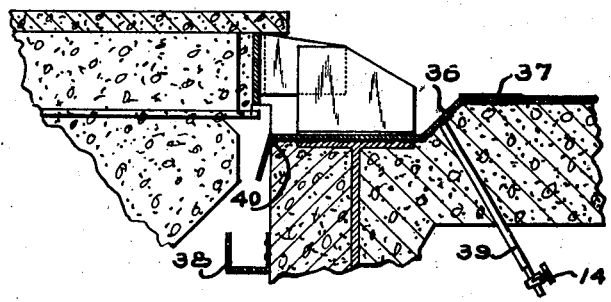

In Fig. 4, there is shown a further example of a structure to be water-proofed. In this case, a lead flashing 36 extends between layers of water-proof strips 37 and is intended to drain into the gutter 38. If the structure should permit leakage underneath the flashing, then it may be water-proofed by the use of my invention. To this end, I drill from underneath to the flashing and insert a nipple 39 for injection of emulsion and agglomerant. Preferably a quick-acting agglomerant, such as calcium chloride, is first used after injecting emulsion to form stopper or sealing portions, such as the portion 40, after which injections of emulsion and slower acting agglomerant, such as silicates, may be made to provide a water-proof layer spreading out and closing off leakage entrances to the space underneath the flashing.

If there is a fairly free flow passage underneath the flashing, as is likely to be the case with a structure of this kind, sealing or plugging is first effected, a sealing plug being indicated for example, at 40 after which agglomeration of plastic medium or asphalt may be secured underneath the flashing 36 and the overlapping structure 37, the agglomerate, not only forming a water-proof layer between the flashing and the concrete and adhering thereto, but sealing the region at the edge of the flashing where ingress of water usually takes place.

As hereinbefore indicated, after the injections are completed in the modes indicated in Figs. 3 and 4, the injection openings are preferably sealed, although the agglomerate may serve this purpose.

Figure 5:
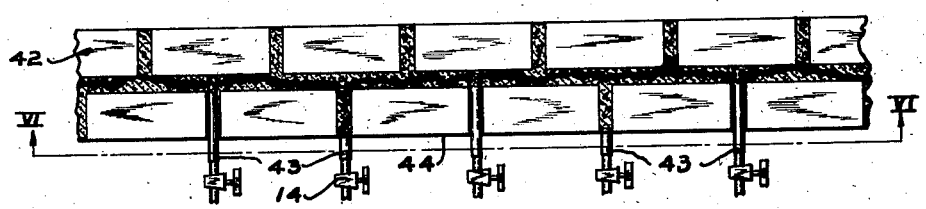
Fig. 5 is a sectional view taken on the line V—V of Fig. 6 showing the invention applied in treatment of a masonry or brick wall.
Figure 6:
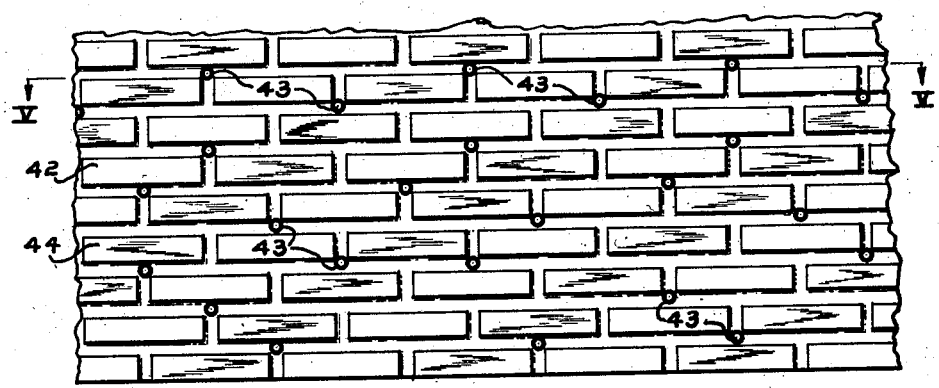
Fig. 6 is a view taken on the line VI—VI of Fig. 5.

In Figs. 5 and 6, I show my invention applied to water-proofing a brick or masonry wall 42. Such a wall, as shown in Fig. 6, ordinarily is constituted by inner and outer layers; and, frequently because of lack of filler or mortar in the space between the layers, the wall is not water-proof. To water-proof such a structure, I provide openings at suitable points, and insert nipples 43 in the openings, after which injections of emulsion and de-emulsifier are made to secure the formation of a water-proof agglomerate in said space. To facilitate removal of emulsion or bituminous or asphalt material accidentally reaching and running down on the outer face 44 of the wall, the latter is first painted with a water soluble medium such as silicate so that the latter forms a base film for the bituminous or asphaltic material; and, as the film is readily dissolved by means of water, the adhering material may be easily and rapidly removed. Also the injection openings are sealed.

Figure 7:
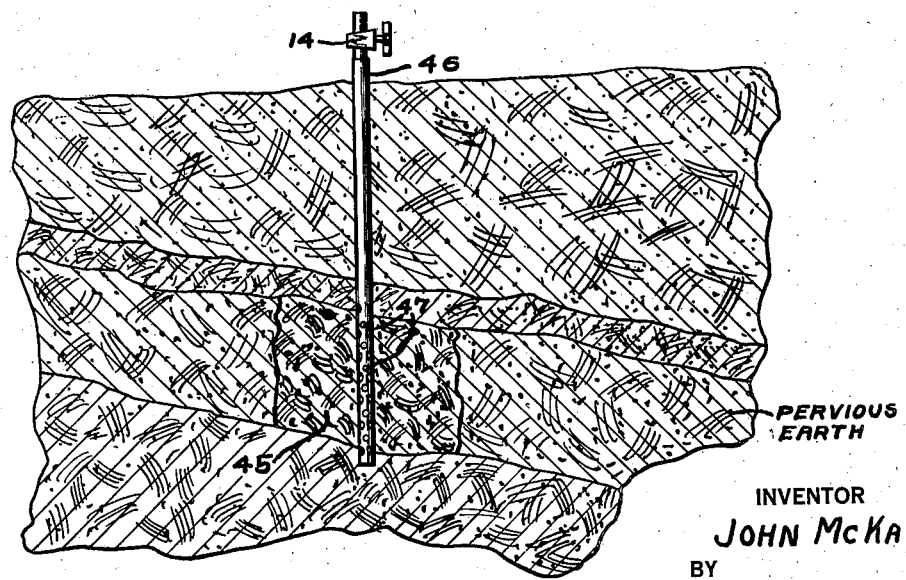
Fig. 7 shows the invention applied to earth treatment.

In Fig. 7, the invention is shown for sealing an earth region, such as indicated at 45, a pipe or pipes 46 being inserted from the surface and each pipe having openings 47 from which issue the media into the adjacent earth material. In this way pervious earth portions may be rendered impervious for any suitable purpose, as, for example, about a well or for the provision of an underground water-tight wall.

Also, the invention applied in this way may be used to improve the foundation character of any suitable earth or gravel formation.

While I prefer to use and refer herein to an emulsion of bituminous material or asphalt, it is to be understood that any plastic organic medium capable of being emulsified and agglomerated may be used. For example, rubber and resinous emulsions may be used; however, as asphalt is economical, durable and relatively inert, I prefer to use it. The emulsion may be prepared in any suitable manner, for example, I have used about 60% asphalt and 40% water with a small amount of soap, for example, ½ to 1%, acting as a dispersion agent, it being understood that the proportions of asphalt and water are not critical, enough water being used to secure the desired fluidity, and the amount of soap being sufficient to secure emulsification.

Asphalt is advantageous in that it is plastic or flexible, a less quantity thereof may be used compared to other media such as cement, it is non-corrosive and protects steel work with which it contacts, and it adheres readily to surfaces of various kinds, to fabrics and membranes.

Any suitable de-emulsifying agent or electrolyte may be used, for example, potassium or sodium silicate, preferably the latter, are satisfactory. If preliminary sealing or filling is required then any of the modes herein proposed may be used: a loose earth formation may receive a preliminary injection of emulsion followed by a quick-acting de-emulsifying agent, such as calcium chloride, after which cement grout may be injected; and, if desired, injections of a slower-acting de-emulsifying agent, such as silicate and emulsion are then made; the emulsion may incorporate an inert and insoluble filler; or voids or free passages may be plugged or sealed in any suitable manner, as by the use of a quick-acting de-emulsifying agent, such as calcium chloride, which produces agglomeration from the emulsion with sufficient rapidity to secure sealing or plugging at desired points or places, after which agglomeration from emulsion by the use of silicate may be had.

The primary feature of my invention is to secure de-emulsification of plastic medium, such as asphalt, from the emulsion at the place required and of a character best suited for the intended purpose. In some situations an injection or emulsion followed by silicate may be sufficient; and, in this connection, injections are made under pressure whose magnitude is dependent on circumstances, the objective being to get the media where required and sufficient contact or mixture thereof to promote the desired agglomeration. In other situations, the de-emulsifying agent and emulsion may be repeatedly and successively injected, or injections of the two media may be made at the same time at points sufficiently close together to secure the desired de-emulsification.

The term "emulsion", as used herein, means any suitable organic material, such as asphalt, bituminous material, rubber, or resinous media, capable of being maintained in emulsion or dispersed by a suitable agent. The terms "de-emulsifier" or "de-emulsification-agent" mean any suitable means or agency to render the dispersion agent ineffective to provide for de-emulsification in situ, and, for this purpose, a soluble inorganic salt having this effect on the dispersion agent is preferably used. Soap is preferred as a dispersion or emulsification agent, as it is readily rendered incapable of performing this function by a variety of soluble inorganic salts, electrolytes, or compounds which act either to convert the soap into an insoluble soap, such as calcium or aluminum soap, or the soap may be forced out of solution, or "salted out." Also, the term "void region", as used herein, is intended to cover a cavity or a loose structure wherein particles are separated by voids and interstices, that is, a region capable of receiving the emulsion and the de-emulsifier.

What I claim is:

1. The method of sealing a crack in a masonry wall structure comprising drilling openings in the structure at either side of the crack and making through the openings successive injections of an emulsion of organic plastic medium and a de-emulsifying agent to effect de-emulsification or agglomeration of the organic medium so that the latter seals the crack.

2. The method of sealing a crack in a concrete wall structure comprising drilling openings in the structure at either side of the crack and making through the openings successive injections of organic plastic medium held in emulsion by soap in solution and of a solution of inorganic medium which is effective to render the soap incapable of holding the organic plastic medium in emulsion, whereby the organic plastic medium is de-emulsified or agglomerated at the region adjacent to the crack so as to cover and seal the latter.

3. The method of sealing a crack in a concrete wall structure comprising drilling openings in the structure at either side of the crack and making, through the openings, successive injections of plastic bituminous medium held in emulsion by soap in solution and of sodium or potassium silicate, whereby the plastic bituminous medium is de-emulsified or agglomerated at the region adjacent to the crack so as to cover and seal the latter.

4. The method of sealing a crack in a concrete wall structure comprising drilling openings through the wall structure at either side of the crack, injecting through one or more of the openings media to provide sealing or backing structure for the region extending over the crack and then making through the openings successive injections of an emulsion of asphalt and of a de-emulsifying agent to provide for agglomeration of asphalt in the region adjacent to the crack to cover and seal the latter.

5. The method of sealing a crack in a concrete wall structure contacting with earth at one side comprising drilling openings through the wall structure at either side of the crack; injecting medium through openings to form a pressure-resisting backing structure disposed in the earth adjacent to the crack; and making successive injections, through the openings into the region confined by the backing structure, of an emulsion of plastic organic medium and of a de-emulsifying agent so that plastic organic medium may be de-emulsified and agglomerated in said confined region and adjacent to the crack so as to seal and cover the latter.

6. The method of sealing an opening in a wall structure contacting with earth at one side comprising providing one or more second openings extending through the wall structure adjacent to the first opening; arranging a nipple in each second opening so that its discharge end is arranged to discharge into the earth region adjacent to the first opening; making successive injections through one or more nipples, with the remaining nipple or nipples closed, of an emulsion of asphalt and of a de-emulsifying agent so as to effect de-emulsification or agglomeration of the asphalt in said region so as to seal said first opening; removing the nipple or nipples; and sealing the second openings.

7. The method of placing plastic organic medium in an inaccessible region of a structure comprising providing a plurality of passages in the structure to afford access to the region; forcing through one or more passages, with the remaining passages closed, plastic medium held in emulsion by soap in solution; then forcing through one or more passages, with the remaining passages closed, an inorganic medium in solution and which renders the soap incapable of holding the plastic medium in emulsion so as to de-emulsify or agglomerate the plastic medium; and finally sealing the passages.

8. The method of water-proofing a wall structure by the provision of plastic organic medium interiorly thereof which comprises providing one or more openings from one face of the wall structure and extending interiorly thereof, injecting an emulsion of organic medium through one or more of said openings, and then injecting a de-emulsifying agent through one or more of the openings to act on the emulsion interiorly of the wall structure to de-emulsify or agglomerate the medium in the latter.

9. The method of water-proofing a wall structure by the provision of organic plastic medium interiorly thereof which comprises providing one or more openings from one face of the wall structure and extending interiorly thereof, placing a water soluble coating on said wall face, injecting an emulsion of organic medium through one or more of the openings, then injecting a de-emulsifying agent through one or more of the openings to effect de-emulsification or agglomeration of the medium interiorly of the wall structure, filling said opening or openings, and removing the coating with any organic medium adhering thereto.

10. The method of water-proofing a wall structure by the provision of bituminous material interiorly thereof which comprises providing a plurality of openings from one face of the wall structure and extending interiorly thereof, placing a soluble coating on said wall face, injecting asphalt held in emulsion by a soap solution through one or more openings to the interior of the wall structure, then in injecting a solution of inorganic material through one or more openings to the interior of the wall structure for action on the soap to render the latter incapable of holding bituminous material in emulsion whereupon the latter de-emulsifies or agglomerates interiorly of the wall structure, filling the openings, and dissolving said coating on the wall face to facilitate removal of any bituminous material adhering thereto.

11. The method of water-proofing an interior portion of a structure comprising providing for access to said portion, forcing into the portion an emulsion of organic plastic medium followed by a de-emulsifying agent to produce sufficiently rapid de-emulsification or agglomeration of the plastic medium that the latter is effective to seal leakage passages from the region, and then successively forcing emulsion of organic plastic medium and a relatively more slowly acting de-emulsification agent successively into the portion to effect de-emulsification or agglomeration in the latter.

12. The method of water-proofing an interior portion of a structure comprising providing for access to said portion, forcing into the portion asphalt held in emulsion by soap in solution followed by a solution of calcium chloride or aluminum sulphate in order to effect de-emulsification or agglomeration of the asphalt with such rapidity that the asphalt is effective to seal the region, and then successively forcing asphalt held in emulsion by soap in solution and sodium or potassium silicate in order to effect de-emulsification and agglomeration of asphalt in the region.

13. The method of filling an inaccessible void region in a body which comprises boring a passage in the body to the void region, supplying an emulsion of organic medium through the bored passage to the void region, and then in supplying a de-emulsification agent through the passage to the void region to bring about de-emulsification and agglomeration of the organic medium in the void region.

14. The method of filling an inaccessible cavity in a structure which comprises providing a passage in the structure to the cavity, supplying an emulsion of organic medium through the passage to the cavity, then in supplying a de-emulsification agent through the passage to the cavity to bring about de-emulsification or agglomeration of organic medium on the cavity walls, and then in injecting medium through the passage to contact with the agglomerated layer of organic medium and to fill the remaining space of the cavity.

JOHN McKAY.